(12) United States Patent
Zhu

(10) Patent No.: US 7,103,691 B2
(45) Date of Patent: Sep. 5, 2006

(54) METHOD, SYSTEM AND DEVICE FOR A PROCESSOR TO ACCESS DEVICES OF DIFFERENT SPEEDS USING A STANDARD MEMORY BUS

(75) Inventor: De Sheng Zhu, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 10/793,360

(22) Filed: Mar. 3, 2004

(65) Prior Publication Data

US 2004/0236892 A1 Nov. 25, 2004

(51) Int. Cl.
G06F 13/36 (2006.01)
G06F 19/00 (2006.01)
G06F 3/12 (2006.01)

(52) U.S. Cl. .................. 710/241; 710/306; 710/311; 379/402

(58) Field of Classification Search ............... 710/241, 710/240, 33, 306, 305, 260, 28, 112, 309, 710/310, 107, 311; 370/401, 402; 712/30; 711/202; 340/825.51
See application file for complete search history.

(56) References Cited

U.S. PATENT DOCUMENTS

| | | | | |
|---|---|---|---|---|
| 5,632,021 A * | 5/1997 | Jennings et al. | ............ | 710/312 |
| 6,012,120 A * | 1/2000 | Duncan et al. | ............. | 710/308 |
| 6,085,330 A * | 7/2000 | Hewitt et al. | ............... | 713/322 |
| 6,141,769 A * | 10/2000 | Petivan et al. | ................ | 714/10 |
| 6,202,112 B1 * | 3/2001 | Gadagkar et al. | ........... | 710/118 |
| 6,223,230 B1 * | 4/2001 | Garnett et al. | ................ | 710/26 |
| 6,240,526 B1 * | 5/2001 | Petivan et al. | ................ | 714/11 |
| 6,247,088 B1 | 6/2001 | Seo | | |
| 6,253,327 B1 * | 6/2001 | Zhang et al. | ................ | 726/14 |
| 6,339,808 B1 * | 1/2002 | Hewitt et al. | ............... | 710/260 |
| 6,473,825 B1 * | 10/2002 | Worley et al. | ............. | 710/306 |
| 6,567,881 B1 * | 5/2003 | Mojaver et al. | ........... | 710/313 |

OTHER PUBLICATIONS

"A novel 2 GHz multi-layer AMBA high-speed bus interconnect matrix for SoC platforms" by Landry et al. (abstract only) Publication Date: May 23–26, 2005.*

* cited by examiner

Primary Examiner—Gopal C. Ray

(57) ABSTRACT

A method for accessing a device, such as a memory device and an interface device, by a processor is disclosed. The method involves the processor requesting access permission for the transfer of data. The bridge device grants access permission. The processor in response to the granting of access permission indicates that the processor is busy with the access. The processor also generates address and control signals for the access. The bridge device indicates that data is ready for transfer. A processing system including the processor and the bridge device is also disclosed.

24 Claims, 6 Drawing Sheets

METHOD, SYSTEM AND DEVICE FOR A PROCESSOR TO ACCESS DEVICES OF DIFFERENT SPEEDS USING A STANDARD MEMORY BUS

BACKGROUND

This invention relates to memory access in a processing system. More particularly, this invention relates to a method, a system and a device for a processor to access memory devices of different speeds using a standard memory bus.

A product, such as a printer, typically includes a specially designed part, such as a print head, for which an accompanying application specific integrated circuit (ASIC) is usually designed. The specially designed print head, which may account for a large proportion of product design cost, is thus leveraged and used in a range of products. For example, a printer family that uses the print head may include a basic printer, a printer with a network functionality, a printer having a network hard disk, a photo printer supporting various types of photo media, and a multi-functional printer including scanner and facsimile functionalities. It would be ideal to build a single ASIC including the different functionalities that can be used across all printers. However, the cost of such an ASIC will be prohibitively high since an ASIC that includes a large number of functionalities is complex to design and produce. The design cycle is proportionately longer than would be required for designing a less complex ASIC. As there are more components in such a complex ASIC, production yield for the ASIC may be lower. Furthermore, building functionalities that are not utilized in an ASIC is also wasteful and adds unnecessary cost to a product.

One solution is to have a basic ASIC for the basic printer and additional function-specific add-on ASICs that can be connected to the basic ASIC. These add-on ASICs are typically connected to the basic ASIC using a Peripheral Component Interconnect (PCI) bus. Such a PCI bus includes sixty or more signal lines, usually more when power and ground signal lines are counted. The basic ASIC and the add-on ASICs supporting such an interface will need to include a corresponding number of ports or pins for interfacing with the PCI bus. These ASICs will cost more than one with a lesser number of pins.

To reduce the number of pins on the basic ASIC, a standard host bus used for accessing an SDRAM has been used to also interface with a bridge device to which a PCI device is connected. Such a design has been disclosed in U.S. Pat. Nos. 5,632,021 and 6,247,088. However, the design suffers a notable disadvantage. To accommodate the bus speeds of slower PCI devices, the standard host bus is operated at only a clock speed of 33 MHz. With some of these PCI devices having relatively long access latency, the sustainable standard bus throughput seldom exceeds 50 Mbytes per second. Operating the SDRAM at such a throughput is not efficient considering that an SDRAM throughput of about 400 Mbytes per second is achievable.

To overcome this disadvantage, another method that is common with standard PC chipsets has been used. According to this method, the bridge ASIC is also connected to the basic ASIC using a host bus. However, the SDRAM, IDE and PCI interfaces are provided by the bridge ASIC. Such a design results in a bridge ASIC that is more complicated and thus costly, especially for low cost printing and imaging products.

SUMMARY

According to an aspect of the present invention, there is provided a method for accessing a device by a processor for the transfer of data therebetween. The device may be a memory device, an interface device or any other suitable devices. The method involves the processor requesting access permission for the data transfer from a bridge device that is connected to the processor. The bridge device grants access permission. The processor in response to the granting of access permission indicates that the processor is busy with the access. The processor also generates address and control signals for the access. The bridge device indicates that data is ready for transfer.

BRIEF DESCRIPTION OF DRAWINGS

The invention will be better understood with reference to the drawings, in which.

DETAILED DESCRIPTION

Figure 1:
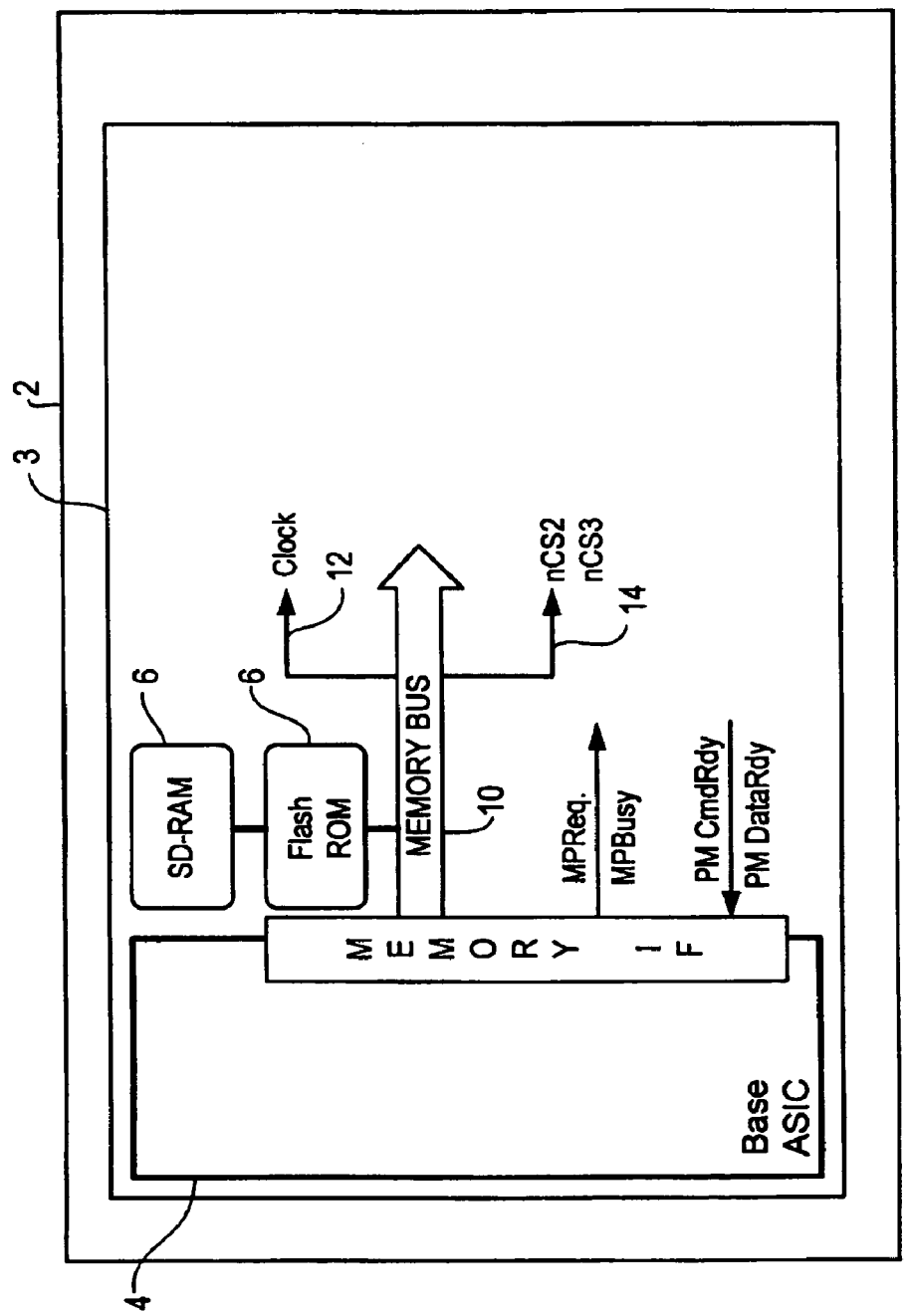
FIG. 1 is a block diagram of a first imaging device including an extendable processing system according to an embodiment of the present invention, the processing system having a processor connected via a memory bus to two memory devices.

FIG. 1 is a block diagram of a first imaging device, such as a basic inkjet printer 2, having an extendable processing system 3 according to one embodiment of the present invention. The processing system 3 includes a processor 4 that controls the various functions of the printer 2. The processor 4 is typically implemented as an application specific integrated circuit (ASIC). The processor 4 is directly connected to local memory devices 6, such as a synchronous dynamic random access memory (SDRAM) and a flash read only memory (ROM) via a standard host or memory bus 10. The processor 4 uses the local memory devices 6 to store temporary variables and buffers associated with the printer functions. The memory bus 10 typically includes a multiplexed 16-bit address bus MA[15:0], a 32-bit data bus MD[31:0], a clock signal 12, several chip select signals 14, and write and output enable signals (not shown). The processor 4 also includes a circuit means for generating handshaking signals MPReq and MPBusy, and receiving handshaking signals, PMCmdRdy and PMDataRdy.

Figure 2:
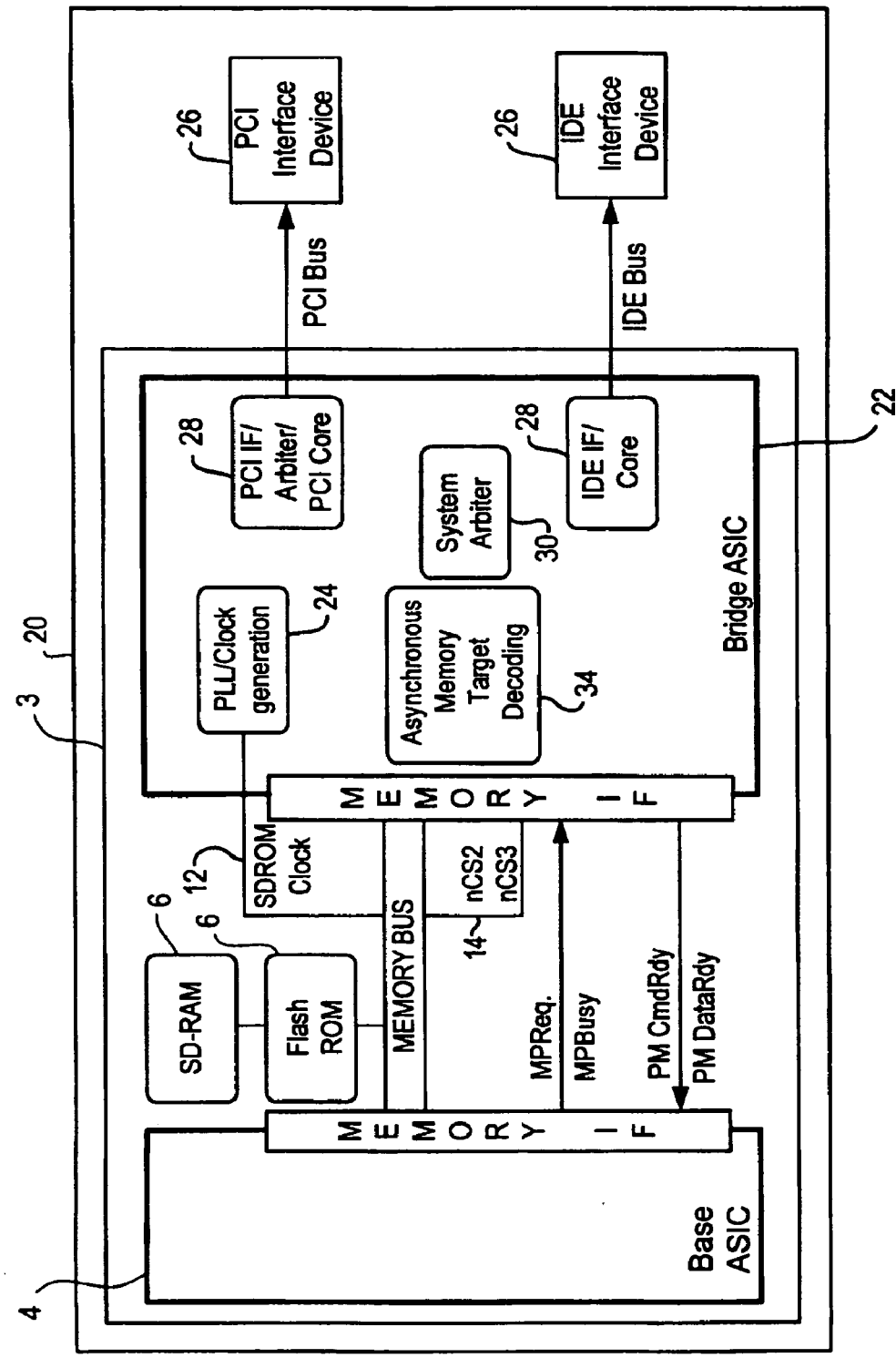
FIG. 2 is a block diagram of a second imaging device having the processing system in FIG. 1, wherein the processing system is extended to include interface devices connected to a bridge device which is in turn connected to the processor via the memory bus and several handshaking lines.

FIG. 2 shows a second imaging device, such as a higher-end inkjet printer 20 having common components (not shown) as the basic printer 2 but with one or more additional functionalities. These additional functionalities includes, but is not limited to, networking capability, provisioning of a network hard disk drive, printing of photos on various types of photo media, faxing and scanning. This higher-end inkjet printer 20 also includes the processing system 3 having the processor 4 for controlling the basic functions of the printer 20. However, to support the additional functionalities, the processing system 3 in this higher-end printer 20 further includes a bridge device 22 that is directly connected to the processor 3 via the memory bus 10. The bridge device 22 may be implemented in another ASIC.

The bridge device 22 includes a clock generation circuit 24 that translates the clock signal 12 obtainable from the memory bus 10 to one or more clock signals (not shown) as required by the bridge device 22 and possibly interface devices 26 that can be connected to the bridge device 22. The bridge device 22 is also provided with interface circuits 28, such as a Peripheral Component Interconnect (PCI) interface circuit and an Integrated Drive Electronics (IDE) interface circuit, depending on the type of interface devices 26 to be connected to the bridge device 22 for providing the additional functionalities. These interface circuits 28 may have access to the memory devices 6 through the bridge device 22. The bridge device 22 has circuit means that includes a system arbitration circuit 30 for managing the handshaking signals MPReq, MPBusy, PMCmdRdy and PMDataRdy.

Generally, the processor 4 generates the MPReq signal when requesting access permission for the transfer of data between the processor 4 and one of the memory devices 6 or one of the interface devices 26. Data is transferred from a memory device 6 or an interface device 26 to the processor 4 in a read access, and data is transferred from the processor to a memory device 6 or an interface device 26 in a write access. The system arbitration circuit 30 of the bridge device 22 receives and responds to the MPReq signal. The system arbitration circuit 30 generates the PMCmdRdy to grant access permission. The processor 4 on receiving the PMCmdRdy signal generates the MPBusy signal to indicate to the bridge device 22 that an access is in progress and the processor is busy with the access. The processor 4 also generates address and control signals for transmission on the memory bus 10 for the access. The processor 4 waits for the receipt of the strobe signal PMDataRdy that indicates that data is ready for transfer, i.e., data is available on the memory bus for reading if the access is a read access or that data may be written to the memory bus if the access is a write access. In other words, the strobe signal PMDataRdy paces data transfer between the processor 4 and the bridge device 22.

Figure 3:
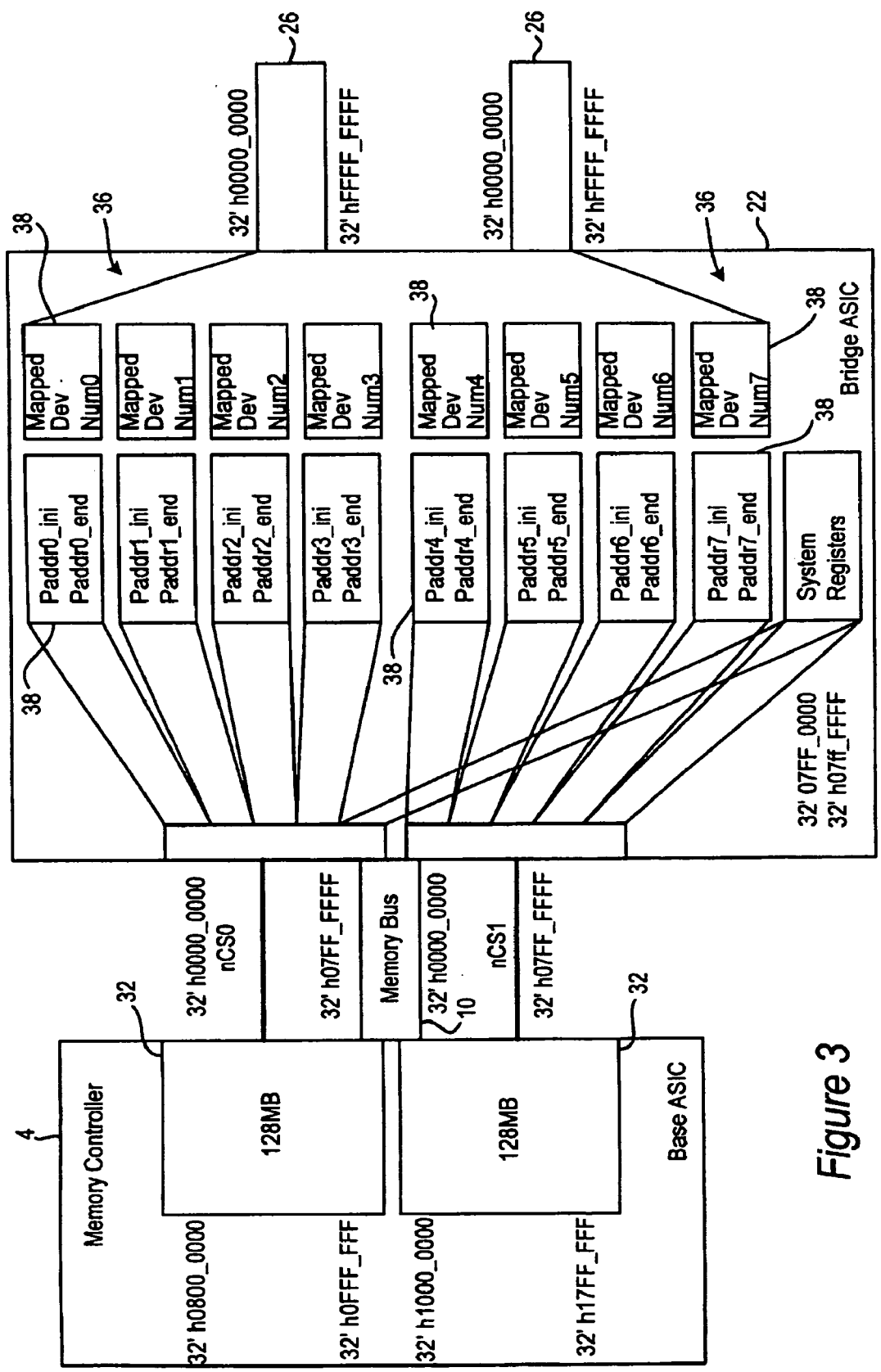
FIG. 3 is a schematic diagram showing translation of addresses of the processor in FIG. 2 to addresses for addressing selected portions of selected interface devices in accordance with an embodiment of the present invention.

According to one embodiment, the bridge device 22 is memory mapped to two contiguous memory channels or portions 32 defined at the processor 4 as shown in FIG. 3. Each memory portion 32 may be of a size of 128 Mbytes. Addresses for addressing these contiguous memory portions 32 may not correspond to addresses required for addressing the interface devices 26. The addresses for addressing the interface devices 26 may be any range of addresses within a 4 Gbyte memory space. The bridge device 22 may thus include an address translation circuit means 34 (FIG. 2) for translating or mapping the addresses or address signals for addressing the 128 Mbyte memory portion 32 to another set of address signals for addressing a selected memory portion (not shown) of the interface devices 26.

The address translation circuit means 34 includes register groups 36 for translation or mapping of addresses as shown in FIG. 3. Each register group 36 includes programmable registers 38 for programming 1) a start address and 2) an end address within the 128 Mbyte memory portion 32 for mapping, 3) a target device 26 to be mapped to, and 4) an address offset to be added to the start and end addresses. In the embodiment as shown in FIG. 3, four register groups 36 of such registers 38 are provided for each of two 128 Mbyte memory portions 32 addressable by the processor 4. Using these four register groups 36, four non-overlapping memory portions (not shown) of one or more interface devices 26 are addressable using the address signals for addressing one of the 128 Mbyte memory portions 32.

Figure 4:
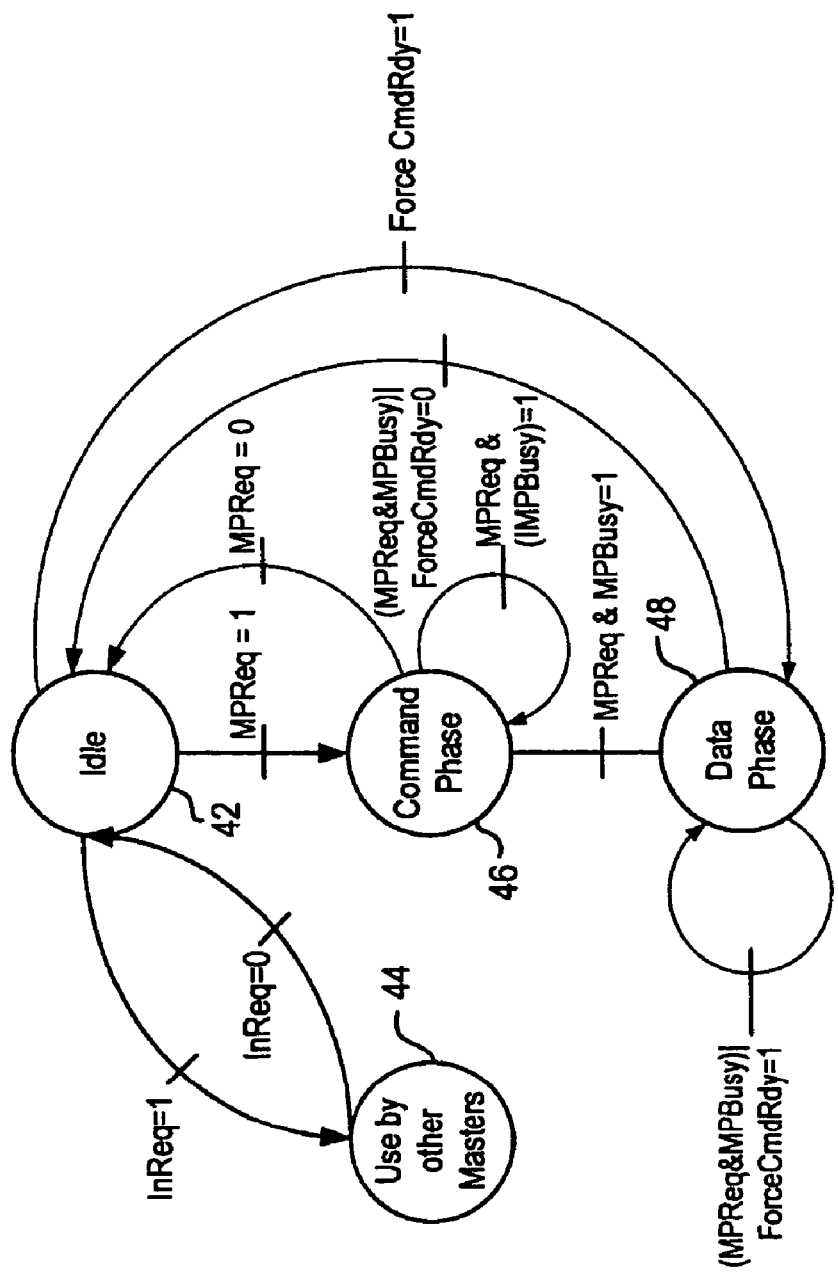
FIG. 4 is a state transition diagram for a state machine that may be implemented on the bridge device in FIG. 2 for managing handshaking signals on the handshaking lines in accordance with an embodiment of the present invention.

The handshaking signals MPReq, MPBusy, PMCmdRdy and PMDataRdy may be conveniently managed in the bridge device 22 using a state machine implementation. FIG. 4 shows a state transition diagram of the state machine. During powering up of the bridge device 22, the state machine is initialized to be at an IDLE state 42. When an interface device 26 requests control of the bridge device 22 for an access by setting an InReq signal high, the state machine moves from the IDLE state 42 to an USED BY OTHER MASTERS state 44. In this state 44, the bridge device 22 will not grant access permission to the processor 4 since the bridge device 22 is busy with the access. The state machine returns to the IDLE state 42 when the interface device 26 completes the access and sets the InReq signal low.

The state machine moves from the IDLE state 42 to a COMMAND PHASE state 46 when the bridge device 22 detects that the MPReq signal has been asserted by the processor 4. The bridge device 22 grants access permission by asserting the PMCmdRdy signal and the state machine remains in this COMMAND PHASE state 46 for as long as the MPBusy signal remains deasserted by the processor 4. However, if the processor asserts the MPBusy signal in response to the assertion of PMCmdRdy signal, the state machine transitions to a DATA PHASE state 48. For as long as the MPReq and MPBusy signals remain asserted, the state machine will remain in the DATA PHASE state 48. In this state 48, the bridge device 22 will assert the PMDataRdy signal either when data is available on the data bus for reading by the processor or when the bridge device 22 is ready to accept data from the processor, i.e., when data is ready for transfer. If at least one of the MPReq and MPBusy signals is deasserted while the state machine is in the DATA PHASE state 48, the state machine returns to the IDLE state 42.

The state machine also moves from the IDLE state 42 to the DATA PHASE state 48 when a special mode granting access permission to the processor 4 is selected by the setting of a ForceCmdRdy signal to a value of one. Such will be the case, when the bridge device 22 determines that an access is for a memory device 6 instead of an interface device 26. The state machine returns to the IDLE state 42 when the ForceCmdRdy bit is set to a value of zero.

Figure 5:
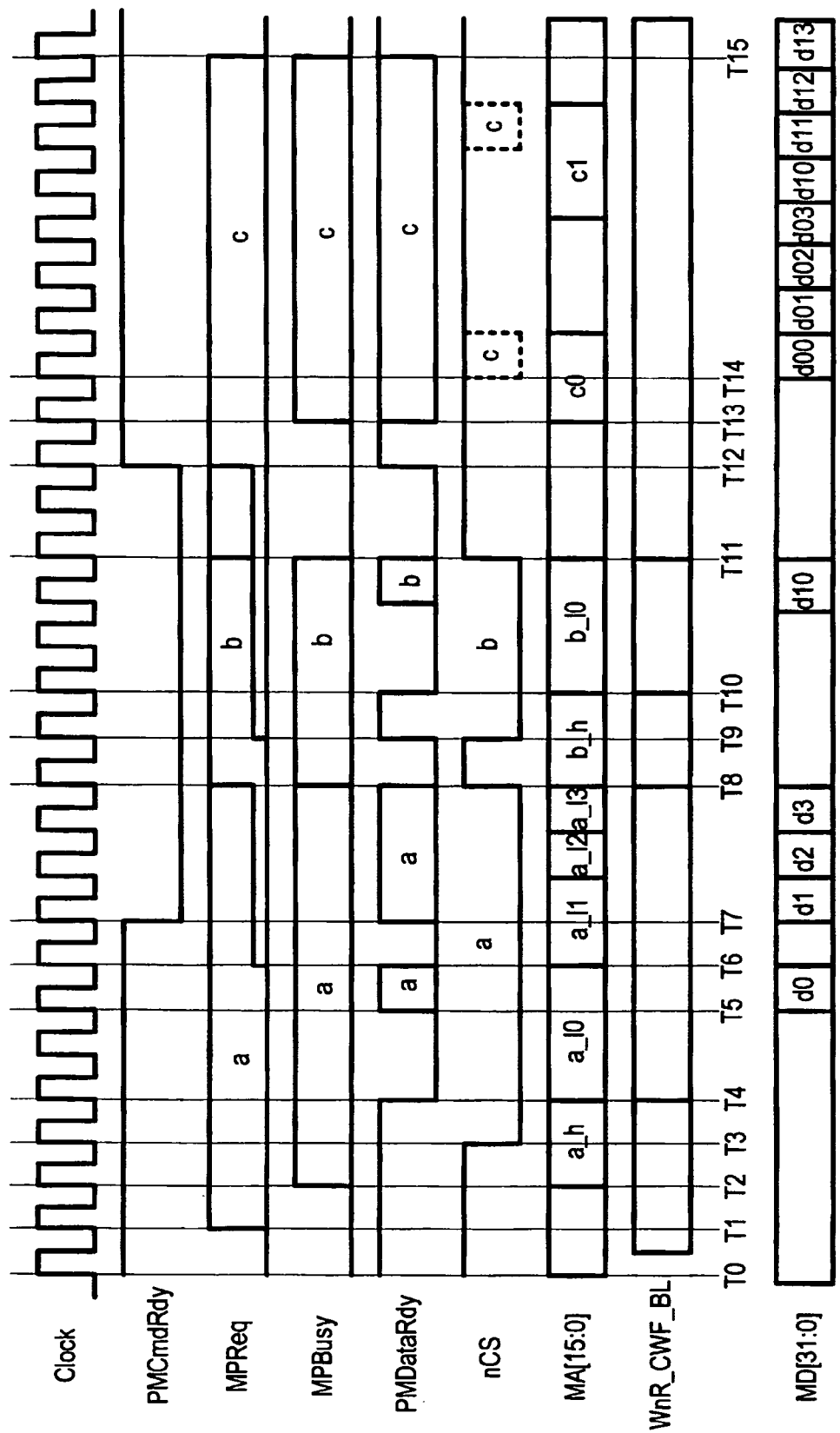
FIG. 5 is timing diagram of signals on the memory bus and the handshaking lines in FIG. 2 for a read access and a write access of one of the interface devices and an access of one of the two memory devices in FIG. 1 in accordance with an embodiment of the present invention.

The specific details of how these signals are used and managed will be next described with the aid of FIG. 5. FIG. 5 is timing diagram of signals on the memory bus 10 and the handshaking signals MPReq, MPBusy, PMCmdRdy and PMDataRdy for three separate data accesses to either one of the interface devices 26 or to one of the memory devices 6. The first data access is a read access of one of the interface devices 26 connected to the bridge device 22. The second access is a write access of one of the interface devices 26. The third access may be a read or write access of one of the memory devices 6. Generally, an interface device 26 has a slower access speed and a memory device 6 has a faster access speed. Unlike what is shown in FIG. 5, a period corresponding to a larger number of clock cycles is usually required for accessing the interface device 26.

At a time T0, the bridge device 22 is placed in the default DATA PHASE state 48 by setting the InReq signal to a value of one. In this default state, the bridge device 22 asserts both the PMCmdRdy and PMDataRdy signals to allow the processor 4 to have immediate access permission should there be a request by the processor 4. In other words, the bridge device 22 keeps the PMDataRdy signal asserted as a default to allow the processor 4 to have quick access to the memory devices 6. In the first data access for reading four 32-bit words from one of the interface devices 26, the processor 4 asserts the MPReq signal to request control of the host bus at a time T1. Since the PMCmdRdy signal is already asserted prior to the assertion of the MPReq signal, the processor 4 immediately recognizes access permission to be granted. The processor 4 then proceeds to assert the MPBusy signal, in acknowledgement of the PMCmdRdy signal, to indicate that the processor 4 is busy with the first access at time T2. The processor 4 keeps the MPReq signal asserted for the entire duration of the first access. At a time T2, the processor 4 also presents an upper portion Addr[27:12] of address signals Addr[27:2] required for the access on the address bus MA[15:0] of the memory bus 10.

At a time T3, the processor 4 asserts a bridge device chip select signal nCS. The bridge device recognizes from the assertion of the chip select signal nCS that the processor 4 wants to access one of the interface devices 26. At a time T4, the bridge device 22 responds to the chip select by deasserting the PMDataRdy signal to indicate to the processor 4 that data for the current access is not available yet. On detecting the deassertion of the PMDataRdy signal, the processor 4 presents a lower portion Addr[11:2] of the address signals Addr[27:2] and control signals WnR_CWF_BL[3:0] on the address bus MA[15:0]. In this particular access, the WnR, CWF, BL[3:0] are used to indicate that the access is a read, critical-word-first (CWF) access involving a burst length (BL) of four 32-bit words.

The address and control signals are translated at the bridge device 22 and communicated to a respective interface circuit 28 for accessing an addressed interface device 26. After the access is completed at the interface device 26 side, the bridge device 22 presents the data, in this particular case fetched data, on the data bus MD[31:0] and reasserts the PMDataRdy signal at a time T5, to indicate to the processor 4 that the first of the four 32-bit words is available.

In response to the assertion of the PMDataRdy signal by the bridge device 22 at time T5, the processor 4 reads the data on the data bus MD[31:0] by a time T6. At this time T6, the processor 4 also increments the lower address portion Addr[11:2] to access the second 32-bit word. At this time, it is also possible while waiting for the first data access to be completed, that the processor 4 initiates a second pipelined data access. In other words, the second data access overlaps the first data access. The processor 4 is able to initiate a new data access before the completion of the first data access. Consequently, with pipelining, the number of data accesses that can be performed during a given time period is greater than that of non-overlapping sequential data accesses. The processor 4 reasserts the MPBusy signal for the second data access. However, since the MPBusy signal is already asserted prior to the reassertion for the second data access, the bridge device 22 may not be aware of the second data access.

When the second 32-bit word is available at the bridge device 22, the bridge device 22 will again assert the PMDataRdy signal, for example at a time T7, to indicate to the processor 4 that data is available on the data bus MD[31:0]. In response to this assertion of the PMDataRdy signal, the processor 4 reads the second 32-bit from the data bus MD[31:0]. Over the next few clock cycles, the processor 4 will repeat incrementing the lower address portion and reading data on the data bus without the bridge device 22 having to further change the PMDataRdy signal.

It is possible that the bridge device 22 may deassert the PMCmdRdy signal, such as during a time T7, because the bridge device 22 either requires use of the memory bus 10 or the bridge device 10 needs to support other functions and is thus no longer able to interact with the processor 4. With the deassertion of the PMCmdRdy signal by the bridge device 22, the processor will have to stop its accessing activities when the current access is completed.

At a time T8, the first access is complete and the bridge device 22 deasserts the PMDataRdy to indicate that data is no longer valid on the data bus MD[31:0]. The processor 4 also deasserts the bridge device chip select signal nCS. However, the processor 4 continues to keep the MPBusy signal asserted since the PMCmdRdy signal remained asserted after the processor 4 initiated the second data access at time T6. The processor 4 also presents a high portion Addr[27:12] of another set of address signals Addr[27:2] for the second data access on the address bus MA[15:0].

At a time T9, the processor 4 asserts the bridge device chip select signal nCS. The bridge device 22 asserts the PMDataRdy signal to indicate that it is ready to accept data. Again, it is possible that the processor 4 may at this time initiate a third pipelined data access as shown in FIG. 5. However, since the PMCmdRdy signal is deasserted, the processor 4 will recognize that access permission is not granted and the processor 4 cannot proceed with the third data transaction after the second access is completed. The processor 4 will have to wait for the bridge device 22 to deassert the PMCmdRdy signal to grant access permission.

At a time T10, the bridge device 22 deasserts the PMDataRdy signal to indicate to the processor 4 that data for the current access is still not available. The processor 4 presents a low portion of the address signals Addr[27:2] on the address bus MA[15:0] along with the appropriate control signals for the second data access. In this particular example, this second data access is a write, non critical-word-first write access involving a burst length of one as shown in FIG. 5. Between the time T10 and a time T11, the bridge device 22 asserts the PMDataRdy signal to indicate that the bridge device 22 is ready to accept data for the write access. The processor 4 then presents the data to be written on the data bus MD[31:0].

At the time T11, the bridge device 22 would have read the data and completed the write access. The bridge device 22 thus deasserts the PMDataRdy signal while keeping the PMCmdRdy signal deasserted. The processor deasserts the bridge device chip select signal nCS and the MPBusy signal since the PMCmdRdy signal remains deasserted. At this point, the memory bus 10 is free for access by the bridge device 22 should there be a need for the bridge device 22 to do so.

When the bridge device 22 is free and is once again available to interact with the processor 4, such as at a time T12 in FIG. 5, the bridge device 22 once again asserts the PMCmdRdy and PMDataRdy signals to grant access permission.

The processor 4 on detecting these signal assertions, will at a time T13, acknowledge the grant of access permission by asserting the MPBusy signal. The processor 4 then proceeds with the third data access which in this case is either a read or a write access to one of the local memory devices 6. Since the PMDataRdy signal is asserted, the processor 4 will proceed to access the addressed local memory device during the next few clock cycles at a speed determined by the internal circuitry (not shown) of the processor 4. As this third data access involves only the addressed local memory device 6, the bridge device chip select nCS is kept deasserted. Under such a condition, the bridge device 22 keeps the PMDataRdy signal permanently asserted to allow the processor 4 to have quick access of the local memory device 6.

At a time T15, the third data access is completed and the processor 4 deasserts the MPBusy signal and since there is no further access by the processor 4, the processor also deasserts the MPReq signal.

Figure 6:
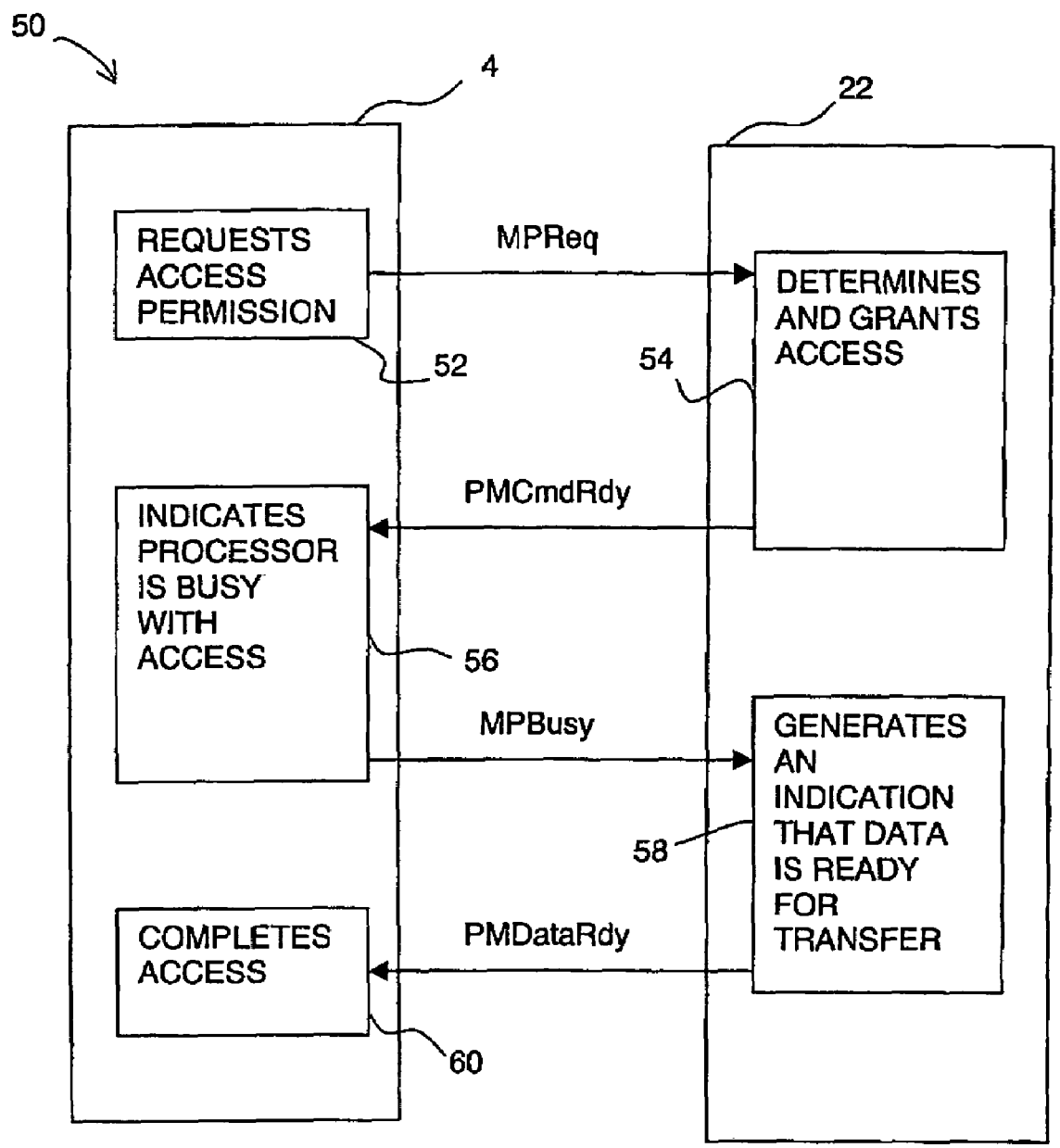
FIG. 6 is a flowchart showing a sequence of steps, in accordance with an embodiment of the present invention, for the exchange of the handshaking signals between the processor and the bridge device in FIG. 2.

Accordingly, the invention may be implemented as a method 50 for accessing a memory device 6 or an interface device 26 by the processor 4 for the transfer of data therebetween, using the bridge device 22. FIG. 6 shows a flowchart of steps performed according to the method 50. The processor 4 requests 52 access permission for the data transfer from the bridge device 22, for example by asserting the MPReq signal. The bridge device 22 determines and grants 54 access permission, if possible, for example by asserting the PMCmdRdy signal. On receiving the access permission, the processor 4 indicates 56 that the processor 4 is busy with the access, for example by asserting the MPBusy signal. Thereafter, the processor 4 generates address and control signals for the access. The bridge device 22 generates 58 an indication that data is ready for transfer, for example by asserting the PMDataRdy signal. The processor 4 completes 60 the access by either reading data from or writing data to the memory bus 10. As described above, in a default state, the bridge device 22 may assert both the PMCmdRdy and the PMDataRdy signals before the processor requests for access permission.

Advantageously, with the extendable processing system described above, only a basic ASIC is required for implementing the processor of a basic printer. Such a system is flexible wherein an add-on ASIC on which the bridge device is implemented can be connected to the basic ASIC when required for supporting additional functionalities. Such an extendable processing system is optimal in cost as no extraneous functionality needs to be built into the basic ASIC. Any extra functionality may be added when required by connecting an appropriate add-on ASIC to the basic ASIC. Also, advantageously, the ASICs are connected using a standard memory bus and a few handshaking lines to keep the pin count and thus the cost of both the ASICs low. Control signals associated with access of the interface devices is embedded on the address bus to avoid having dedicated lines for these control signals so as to keep the pin count of the ASICs low. Moreover, with the handshaking scheme described above, it is not necessary for the memory bus when accessing the local memory devices, to be operated at the lower speed of the interface devices as in the prior art. When accessing the local memory devices, the processor is able to operate at substantially the speed of the local memory devices. That is, there is no degradation in performance when accessing the local memory devices. The processor is paced by the PMCmdRdy and PMDataRdy signals when accessing the interface devices.

Although the present invention is described as implemented in the above-described embodiment, it is not to be construed to be limited as such. For example, the processor, the bridge device and the interface devices may be implemented in one or more ASICs.

As another example, the method and processing system that embody the invention may also be used to access devices other than the memory devices and the interface devices described above.

I claim:

1. A method for accessing a device by a processor for the transfer of data therebetween, the method comprising:
   requesting access permission by the processor in a pipelined manner for the data transfer from a bridge device;
   granting access permission by the bridge device;
   indicating by the processor that the processor is busy with the access;
   generating address and control signals for the access; and
   utilizing the bridge device to generate an indication that data is ready for transfer.

2. A method according to claim 1, further including indicating that the processor has completed an access.

3. A method according to claim 1, wherein the device comprises a memory device and utilizing the bridge device to generate an indication that data is ready for transfer includes utilizing the bridge device to generate a permanent indication to indicate that data is ready for transfer during access of the memory device.

4. A method according to claim 1, wherein the device comprises an interface device and generating address and control signals includes generating address signals and at least one control signal for transmission on an address bus when accessing the interface device.

5. A method according to claim 4, wherein generating at least one control signal for transmission on an address bus includes generating a read-write control signal, a critical-word-first control signal and a burst-length control signal on the address bus.

6. A method according to claim 1, wherein the device comprises an interface device and the method further including mapping at least one selected portion of the address signals to another set of address signals for addressing a selected memory portion of the interface device.

7. A method for accessing a device by a processor for the transfer of data therebetween, the method comprising:
   requesting access permission by the processor for the data transfer from a bridge device:
   granting access permission by the bridge device;
   indicating by the processor that the processor is busy with the access;
   generating address and control signals for the access; and
   utilizing the bridge device to generate an indication that data is ready for transfer,
wherein granting access includes granting access permission as a default unless it is determined that the bridge device is busy, and wherein access permission is withdrawn at the end of a current access.

8. A processing system comprising:
   a processor for accessing a device including:
      means for requesting access permission in a pipelined manner for a data transfer from a bridge device;
      means for receiving access permission;
      means for indicating that the processor is busy with the access;

means for generating address and control signals for the access; and means for receiving an indication which indicates that data is ready for transfer.

9. A processing system according to claim 8, further comprising means for indicating that the processor has completed an access.

10. A processing system according to claim 8, further comprising:
a bridge device, connected to the processor, said bridge device comprising:
means for granting access permission; and
means for generating the indication which indicates that data is ready for transfer.

11. A processing system according to claim 10, wherein the device comprises an interface device and the bridge device further includes means for mapping at least one selected portion of the address signals to another set of address signals for addressing a selected memory portion of the interface device.

12. A processing system according to claim 8, wherein the device comprises a memory device and the means for indicating that data is ready for transfer includes means for permanently indicating that data is ready for transfer during access of the memory device.

13. A processing system according to claim 8, wherein the device comprises an interface device and the means for generating address and control signals includes means for generating address signals and at least one control signal for transmission on an address bus when accessing the interface device.

14. A processing system according to claim 13, wherein means for generating at least one control signal for transmission on an address bus includes means for generating a read-write control signal, a critical-word-first control signal and a burst-length control signal on the address bus.

15. A processing system comprising:
a processor for accessing a device, said processor comprising:
means for requesting access permission for a data transfer from a bridge device;
means for receiving access permission;
means for indicating that the processor is busy with the access
means for generating address and control signals for the access; and
means for receiving an indication which indicates that data is ready for transfer; and
a bridge device, connected to the processor, said bridge device comprising:
means for granting access permission; and
means for generating the indication which indicates that data is ready for transfer,
wherein the means for granting access permission includes means for granting access permission as a default unless it is determined that the bridge device is busy, and wherein access permission is withdrawn at the end of a current access.

16. An imaging device comprising:
a processor for accessing a device, said processor comprising:
means for requesting access permission for a data transfer from a bridge device;
means for receiving access permission:
means for indicating that the processor is busy with the access;
means for generating address and control signals for the access; and
means for receiving an indication which indicates that data is ready for transfer.

17. A bridge device connectable to a processor comprising:
means for receiving a pipelined request for access permission for transfer of data;
means for granting access permission in response to the request;
means for receiving an indication that an access is still in progress;
means for receiving address and control signals from the processor; and
means for indicating that data is ready for transfer.

18. A bridge device according to claim 17, further including means for receiving an indication that the processor has completed an access.

19. A bridge device according to claim 17, wherein the means for indicating that data is ready for transfer includes means for permanently indicating that data is ready for transfer during a memory device access.

20. A bridge device according to claim 17, wherein the means for receiving address and control signals includes means for receiving address signals and at least one control signal on an address bus of a memory bus.

21. A bridge device according to claim 20, wherein means for receiving at least one control signal on the address bus includes means for receiving a read-write control signal, a critical-word-first control signal and a burst-length control signal on the address bus.

22. A bridge device according to claim 17, further including means for mapping at least one selected portion of the address signals to another set of address signals for addressing a selected memory portion of at least one interface device.

23. A bridge device connectable to a processor comprising:
means for receiving a request for access permission for transfer of data;
means for granting access permission in response to the request;
means for receiving an indication that an access is still in progress;
means for receiving address and control signals from the processor; and
means for indicating that data is ready for transfer,
wherein the means for granting access permission includes means for granting access permission as a default unless it is determined that the bridge device is busy, and wherein access permission is withdrawn at the end of a current access.

24. A bridge device according to claim 23, further including means for mapping at least one selected portion of the address signals to another set of address signals for addressing a selected memory portion of an interface device.

* * * * *

UNITED STATES PATENT AND TRADEMARK OFFICE
CERTIFICATE OF CORRECTION

| | | |
|---|---|---|
| PATENT NO. | : 7,103,691 B2 | Page 1 of 1 |
| APPLICATION NO. | : 10/793360 | |
| DATED | : September 5, 2006 | |
| INVENTOR(S) | : De Sheng Zhu | |

It is certified that error appears in the above-identified patent and that said Letters Patent is hereby corrected as shown below:

In column 8, line 50, in Claim 7, after "device" delete ":" and insert -- ; --, therefor.

In column 9, line 44, in Claim 15, after "access" insert -- ; --.

In column 10, line 1, in Claim 16, after "permission" delete ":" and insert -- ; --, therefor.

Signed and Sealed this

Thirteenth Day of July, 2010

David J. Kappos
*Director of the United States Patent and Trademark Office*